(12) United States Patent
Qian et al.

(10) Patent No.: US 8,137,163 B2
(45) Date of Patent: Mar. 20, 2012

(54) BURNISH HEAD DESIGN WITH MULTIPLE PADS ON SIDE RAIL

(75) Inventors: Weimin Qian, Mountain View, CA (US); Igor V. Sytine, Plymouth, MN (US); Matthew Aaron Carper, Minneapolis, MN (US); Pranesh Swany, Tracy, CA (US); Eric K. Dahlin, San Jose, CA (US); Hamid F. Ghazvini, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 533 days.

(21) Appl. No.: 12/405,031

(22) Filed: Mar. 16, 2009

(65) Prior Publication Data
US 2010/0233943 A1 Sep. 16, 2010

(51) Int. Cl.
*B24B 5/00* (2006.01)

(52) U.S. Cl. ............ 451/324; 451/540; 451/5; 451/552; 360/235.9

(58) Field of Classification Search .............. 451/5, 324, 451/540, 552; 29/603.07; 360/235.9, 236.7
See application file for complete search history.

(56) References Cited

U.S. PATENT DOCUMENTS

| | | | | |
|---|---|---|---|---|
| 4,838,899 A * | 6/1989 | Bifuk | ................................ | 51/293 |
| 4,845,816 A * | 7/1989 | Nanis | ........................... | 29/90.01 |
| 5,572,794 A * | 11/1996 | Kalbern | ............................ | 30/353 |
| 5,619,889 A * | 4/1997 | Jones et al. | ................... | 76/104.1 |
| 5,658,191 A * | 8/1997 | Brezoczky | ..................... | 451/324 |
| 5,863,237 A | 1/1999 | Felts et al. | | |
| 5,887,580 A * | 3/1999 | Eyre | .............................. | 125/36 |
| 5,926,344 A * | 7/1999 | Kimura | ....................... | 360/236.7 |
| 5,942,680 A | 8/1999 | Boutaghou | | |
| 6,112,401 A * | 9/2000 | Smith, Jr. | .................... | 29/603.12 |
| 6,144,529 A * | 11/2000 | Wada et al. | ................. | 360/236.1 |
| 6,183,349 B1 * | 2/2001 | Burga et al. | ..................... | 451/41 |
| 6,267,645 B1 * | 7/2001 | Burga et al. | ..................... | 451/41 |
| 6,322,431 B1 | 11/2001 | Schaenzer et al. | | |
| 6,357,095 B1 * | 3/2002 | Duan et al. | .................... | 29/90.01 |
| 6,358,123 B1 * | 3/2002 | Liners et al. | .................... | 451/41 |
| 6,503,132 B2 * | 1/2003 | Ekstrum et al. | .............. | 451/312 |
| 6,526,639 B2 * | 3/2003 | Duan et al. | .................... | 29/90.01 |
| 6,580,572 B1 | 6/2003 | Yao et al. | | |
| 6,611,401 B1 | 8/2003 | Burga et al. | | |
| 6,754,043 B2 * | 6/2004 | Kasamatsu et al. | ........ | 360/235.8 |
| 6,927,942 B2 * | 8/2005 | Tani et al. | .................. | 360/235.6 |
| 7,153,193 B1 | 12/2006 | Kurita et al. | | |
| 7,164,557 B2 | 1/2007 | Agrawal et al. | | |
| 7,255,636 B2 * | 8/2007 | Hu et al. | ....................... | 451/319 |

(Continued)

FOREIGN PATENT DOCUMENTS
WO    WO9722441 A1    6/1997

*Primary Examiner* — George Nguyen
(74) *Attorney, Agent, or Firm* — Braden Katterheinrich

(57) ABSTRACT

A disc burnishing head includes an array of burnishing pads and a first and second side rail projecting from a bottom surface of a slider body. The side rails each have an inside surface facing the burnishing pads and an outside surface facing outward. The outside surface of at least the first side rail is serrated. The serrations define a plurality of teeth and notches on the outside surface of the first side rail for cutting, cleaning, and conditioning defects from the surface of a disc.

18 Claims, 7 Drawing Sheets

U.S. PATENT DOCUMENTS

| | | | |
|---|---|---|---|
| D559,939 S * | 1/2008 | Veff, III | D22/118 |
| 7,314,404 B2 * | 1/2008 | Singh et al. | 451/63 |
| 2001/0050091 A1 | 12/2001 | Yao et al. | |
| 2002/0039876 A1 | 4/2002 | Ekstrum et al. | |
| 2006/0223418 A1 * | 10/2006 | Zheng et al. | 451/5 |
| 2007/0111645 A1 * | 5/2007 | Hu et al. | 451/63 |
| 2007/0209196 A1 * | 9/2007 | Lau et al. | 29/737 |
| 2010/0196737 A1 * | 8/2010 | Dugas | 428/800 |
| 2010/0287779 A1 * | 11/2010 | Wilson | 30/122 |
| 2011/0136412 A1 * | 6/2011 | Dovel | 451/45 |

* cited by examiner

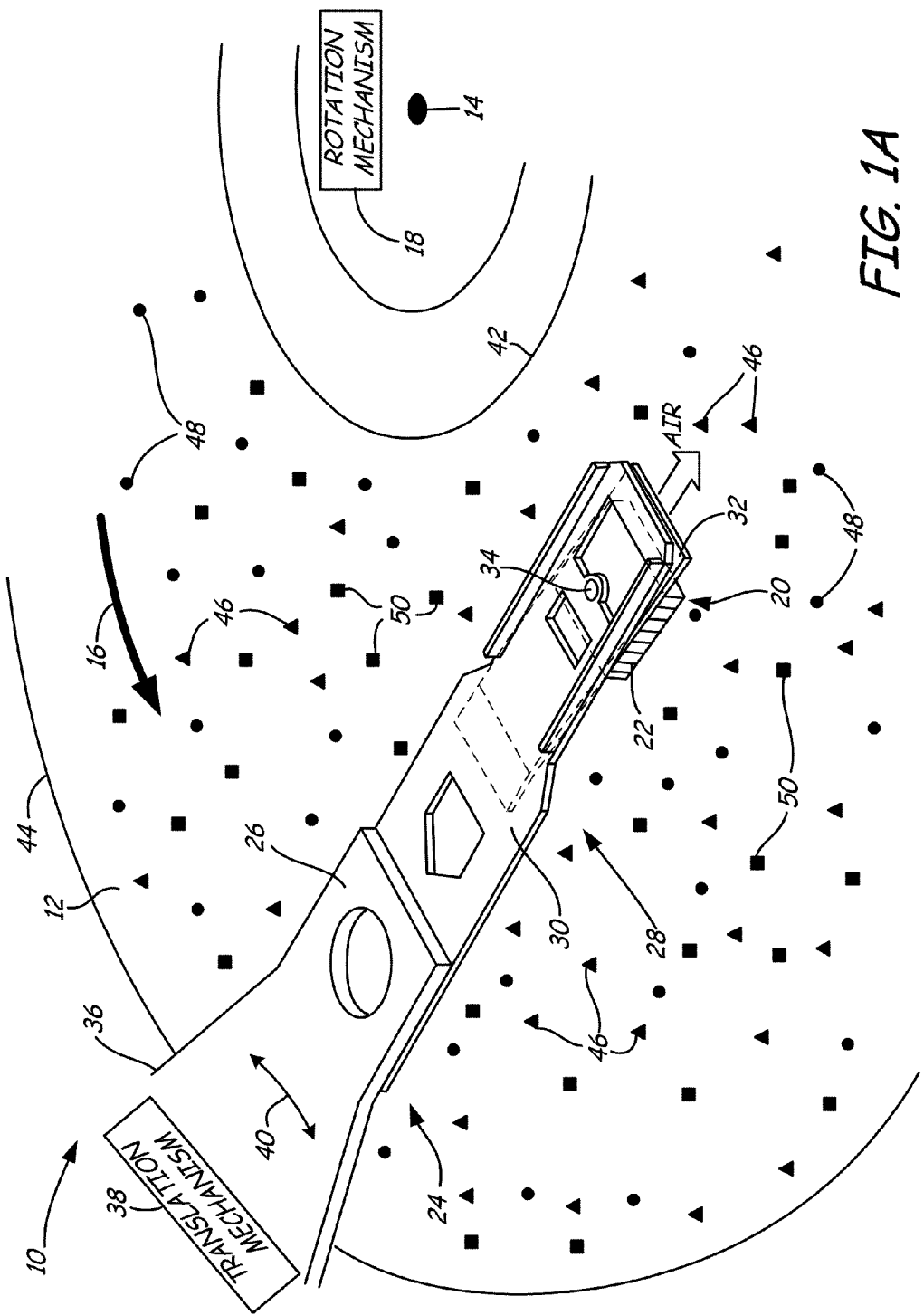

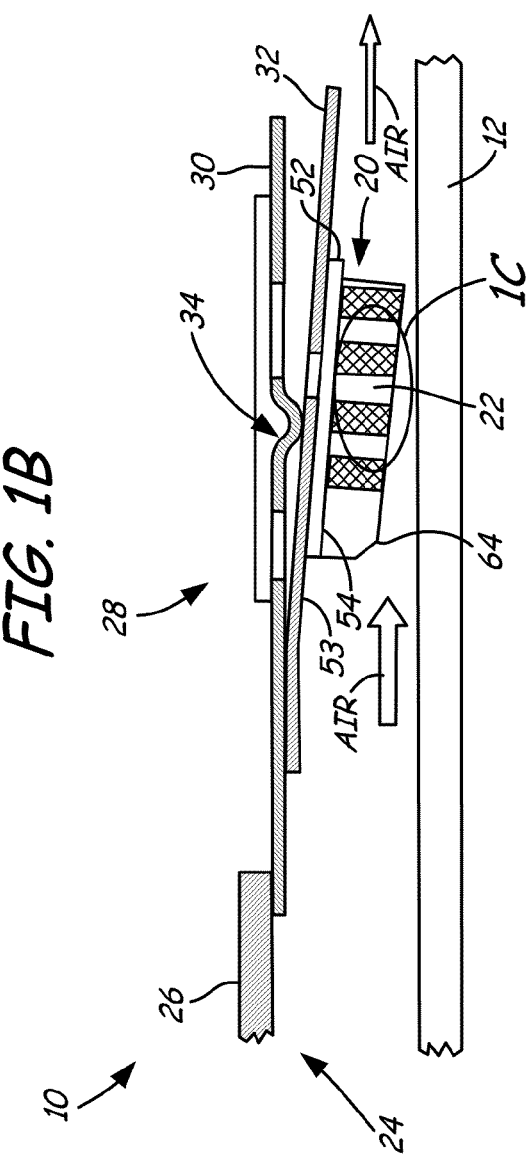
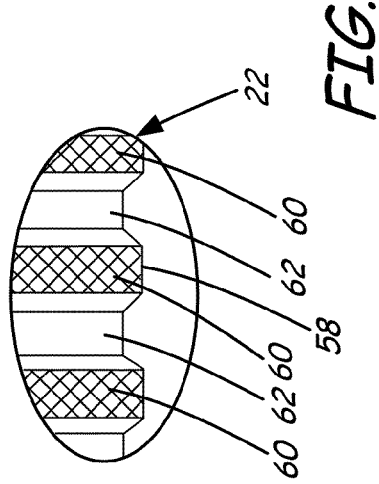

BURNISH HEAD DESIGN WITH MULTIPLE PADS ON SIDE RAIL

BACKGROUND

The present invention relates to disc drive systems and more particularly to a method and apparatus for burnishing asperities or irregularities from the surface of a disc.

In data processing systems, magnetic disc drives are used frequently as data storage devices. Data is written onto a rotating magnetic disc by an adjacent read-write head for later retrieval by the same head. The read-write head is located on a slider body, which is mounted to one end of a translatable arm that moves the head in a generally radial direction across the surface of the disc. As the disc spins, the read-write head flies above or below the surface of the disc, with the distance between the head and the surface of the disc depending on the rotational speed of the disc, the elastic force of the arm's suspension, and the shape and surface features of the slider body.

With the disc spinning at thousands of revolutions per minute (rpm), any unwanted interaction between the head and the disc surface can cause both short-term and long-term operational problems. This interaction can range from a thermal asperity to a full head crash. Consequences of contact or near-contact can include a failed read or write process, a temporary performance loss of the read-write head, a permanent defect on the disc surface, or total failure of the drive. These defects must be reduced or removed to provide sufficient clearance for the read-write head throughout the life of the product. Therefore, steps must be taken during the manufacturing process to flatten the disc surface as completely as possible, thereby improving product life and avoiding catastrophic head crashes. Typically, this is done by a burnish process after the disc media is fabricated.

During burnishing, the disc is rotated and the arm with the attached burnishing head is translated across the disc surface between an inner and outer diameter. The burnishing head is designed to fly close to the disc so as to physically contact defects protruding from the disc surface. The head is typically designed with burnishing pads and side rails on a contact surface projecting toward the disc to cut asperities and deflect loose particles as the disc rotates.

In combination with burnishing, a glide testing apparatus is also used to verify that the disc has been burnished sufficiently to meet quality and reliability requirements. The flying height of the glide head is typically lower than the operating height of the read-write head in the final product. The purpose of the lower flying height is to ensure removal of defects with the goal of improving quality and extending the useful life of the drive. A piezoelectric or thermal sensor or similar sensing means on the glide head is triggered each time that it encounters a defect on the surface. A control device electrically connected to the sensing means and the translator mechanism records the location of each defect in memory.

The distance between the disc and read-write head has necessarily decreased with advances in disc drive technology. The read-write head in modern disc drives flies nearly in contact with the disc at all times during normal operation. Therefore, to burnish each operative surface of the disc well below the design clearance of the read-write head, the burnishing methods and the burnishing head must also be improved to meet the increased demands of discs with higher data density.

SUMMARY

A burnishing head for burnishing and cleaning the surface of a disc includes a slider body having a top mounting surface, bottom surface, burnishing pads, and first and second side rails, which project from the bottom surface of the slider body. The side rails each have an inner surface and outer surface, with at least the first side rail having a serrated outer surface.

A disc burnishing apparatus includes a burnishing head, a rotation mechanism for rotating a disc, and a translation mechanism for sweeping the burnishing head across the surface of a disc as the disc is rotated. The burnishing head includes a slider body, an array of burnishing pads, and first and second side rails, at least one of which has a serrated outer surface.

BRIEF DESCRIPTION OF THE DRAWINGS

FIG. 1A is a top perspective view of a disc burnishing system with a side rail having a serrated outer surface.

FIG. 1B is a side view of the disc burnishing system shown in FIG. 1A, including the burnishing head with a side rail having a serrated outer surface.

FIG. 1C is an enlarged view of a portion of the burnish head shown in FIG. 1B.

DETAILED DESCRIPTION

Figure 2A:
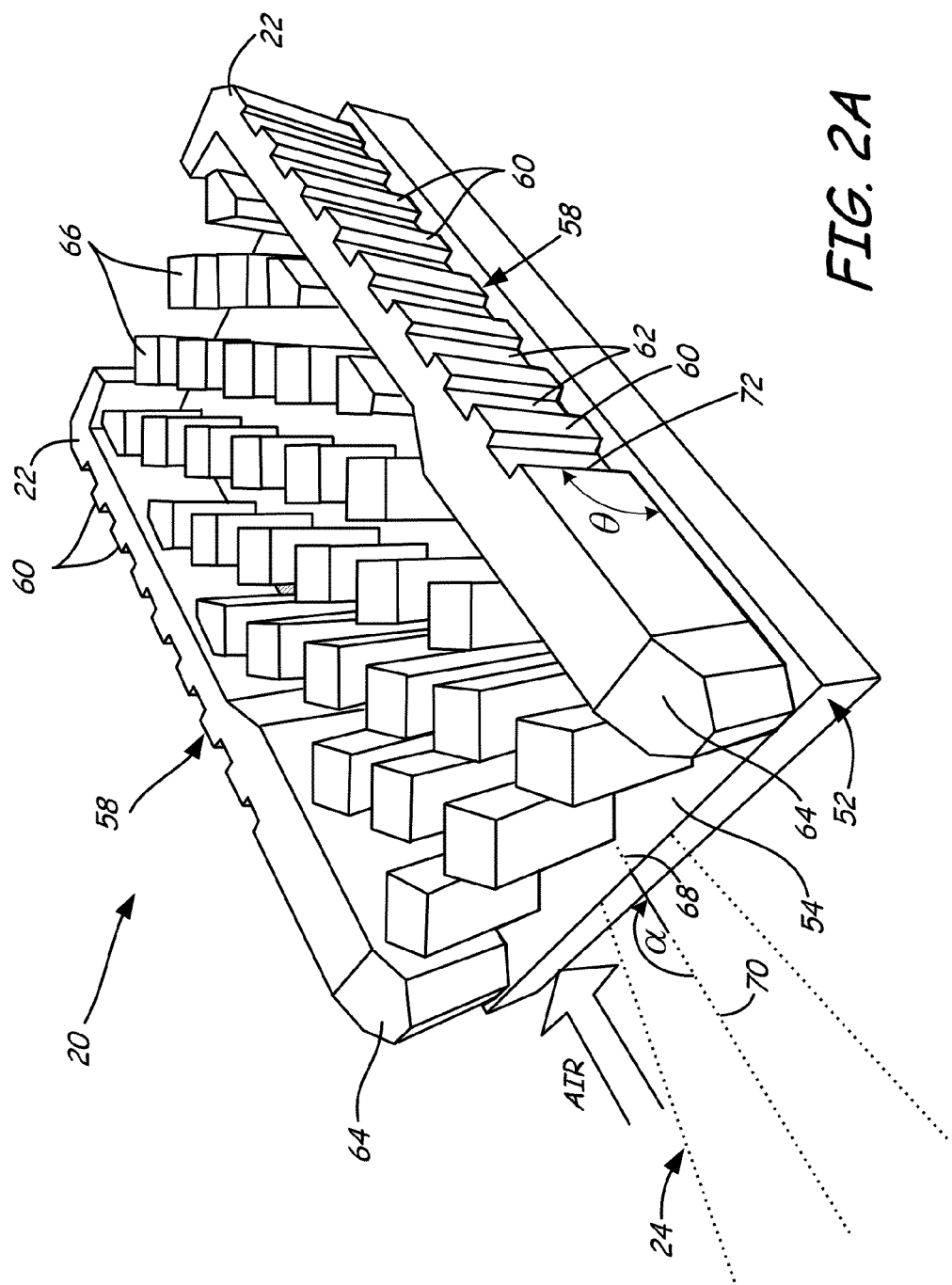
FIG. 2A is a perspective view of the bottom surface of the burnish head with two side rails and rectangular serrations on the outer surfaces of both rails.

A more efficient burnish process for data storage media such as magnetic discs can reduce the cost of manufacturing by decreasing the number of burnishing cycles necessary on a single machine to achieve the desired clearance. Alternatively or in tandem with a decreased number of cycles, cost savings may also be seen by reducing the number of machines necessary to maintain an adequate rate of production, thereby decreasing the required capital investment. The gains in burnishing efficiency and resulting reduction in clearance may also be leveraged by increasing the recording density of discs, which have the ultimate effect of increasing data storage capacity of disc drives. One method of improving the burnishing process is through the use of burnishing heads with improved cutting efficiency and loose particle deflection and retention.

FIG. 1A schematically depicts disc burnishing system 10, which performs a burnishing process on a surface of magnetic disc 12. Burnishing system 10 includes disc 12 to be burnished by burnishing head 20. Disc 12 is rotated around center 14 in direction 16 by means of rotation mechanism 18. Adjacent to disc 12, burnishing head 20 with serrated side rail 22 is mounted to translator arm 24. Translator arm 24 comprises swing arm 26 and suspension system 28. Swing arm 26 is mechanically connected at trailing end 36 to translation mechanism 38. Swing arm 26 is operably connected at the opposite end to suspension system 28. It should be noted that in FIG. 1A, head 20 and arm 24 have been magnified relative to disc 12.

In this example of suspension system 28, load beam 30 connects elastically to flexure 32. Dimple 34 on load beam 30 protrudes toward flexure 32, permitting head 20 to move with the topography of disc 12. The elastic force of suspension system 28 counteracts the air pressure pushing burnishing head 20 away from disc 12, resulting in burnishing head 20 flying at a substantially constant height over the surface. Data may be recorded on both the top and bottom surfaces of disc 12, in which case a similar suspension and burnishing head may be provided below disc 12 and operated in tandem with suspension system 28 and burnishing head 20 to burnish the bottom surfaces. Other suspension systems may be substituted for suspension system 28.

As disc 12 rotates in the direction indicated by arrow 16, translation mechanism 38 moves translator arm 24 in an arc in the direction shown by arrow 40. This achieves the desired effect of sweeping burnishing head 20 across the top or (bottom) surface of disc 12 between inner radius 42 and outer radius 44. Arm 24 may be translated continuously during rotation of disc 12 or in a predetermined distance/time combination such that burnishing is performed in concentric regions of disc 12.

FIG. 1A also illustrates the types of surface defects that need to be removed by the burnishing process. These defects include asperities 46, loose particles 48, and contaminants 50.

FIG. 1B and FIG. 1C depict a side view of disc 12, burnishing head 20, and translator arm 24 shown in FIG. 1A. Burnishing head 20 comprises slider body 52 mounted to bottom mounting surface 53 of flexure 32, and comprises several features including serrated side rails 22 and tapered leading edge 64.

As seen in FIGS. 1A and 1B, air dragged by the spinning of disc 12 flows toward and under burnishing head 20. Air flowing under side rails 22 first encounters tapered leading edges 64, which are shaped to provide lift. The surfaces of side rails 22 proximate to disc 12 act as air bearing surfaces creating lift from the passing air, causing burnishing head 20 to fly at a substantially constant height over the surface of disc 12. Burnishing head 20 effectively burnishes and cleans the surface of disc 12 by keeping this height as low as possible without damaging disc 12. This allows the features projecting from surface 54 of burnishing head 20 to reduce or cut off asperities 46, collect contaminants 48, and deflect or collect loose particles 50 located on the surface of disc 12.

FIG. 1C depicts an exploded view of some of the features of burnishing head 20 depicted in FIG. 1B. These magnified features include side rail 22 with serrated outer surface 58. Serrated outer surface 58 with teeth 60 and notches 62 improve both the overall cutting and cleaning performance of burnishing head 20 compared to smooth or non-serrated side wall outer surfaces. Serrated outer surface 58 provides for increased surface area for reducing and cutting asperities 46 and more area to deflect and collect loose contaminants 48 and particles 50 from the surface of disc 12. Serrated outer surface 58 can take a variety of forms, with teeth and notches of different shapes. Some examples are shown in FIGS. 2A-3C.

Figure 2B:
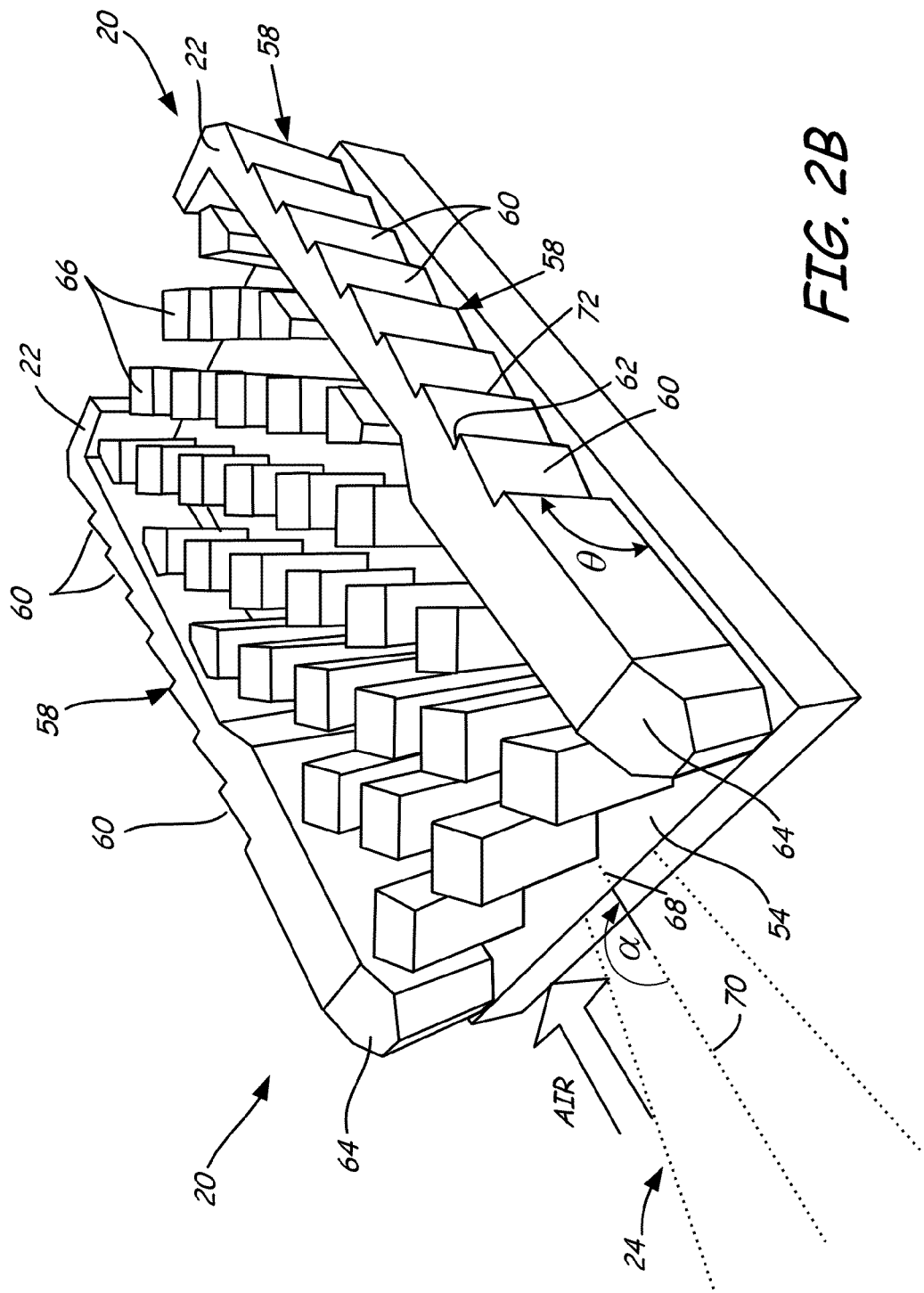
FIG. 2B is a perspective view of the bottom surface of the burnish head with two side rails and triangular, sawtooth-like serrations on the outer surfaces of both rails.

FIG. 2A depicts a bottom perspective view of burnishing head 20 with rectangular serrations on outer surfaces 58 of both side rails 22. Side rails 22 and a plurality of burnishing pads 66 project from surface 54 of burnishing head 20. FIG. 2A depicts a bottom perspective view of burnishing head 20 where serrated outer surfaces 58 define teeth 60 and rectangular notches 62. FIG. 2B depicts a bottom perspective view of burnishing head 20 where serrated outer surfaces define teeth 60 and triangular notches 62. Teeth 60 and notches 62 may also have shapes such as trapezoidal (as shown in FIG. 16) other polyhedral and irregular shapes. FIGS. 2A and 2B also show burnishing pads 66 with rectangular and triangular cross sections projecting from surface 54 although other regular or irregular burnishing pad cross sections can also be used. In FIGS. 2A and 2B, side rails 22 and burnishing pads 66 have been magnified relative to the remainder of burnishing head 20 in order to illustrate some of the features and benefits of serrated outer surface 58.

Serrated outer surfaces 58 shown in FIGS. 2A and 2B provide improved burnishing performance as a result of the additional cutting surface area provided by teeth 60 and notches 62. Various surface defects on disc 12 will come into contact with one or more of these features during the burnishing process. The additional cutting surface areas of teeth 60 as currently disclosed result in more asperities 46 being removed per rotation of disc 12 compared to a burnishing head with straight sided (non-serrated) siderails. With serrated outer surface 58, many asperities 46 can be reduced or cut off by teeth 60 before reaching burnishing pads 66, thereby producing a flatter disc surface with fewer protrusions, thus reducing the potention number of cycles required to complete the burnishing process.

Performance of burnishing head 20 may be further enhanced by changing the angles at which teeth 60 and notches 62 project from side rails 22 and surface 54. In the embodiments shown in FIGS. 2A and 2B, the walls 72 of notches 62 are perpendicular to surface 54 and angle $\theta$ equals 90° However, teeth 60 and notches 62 need not be symmetric, nor is it required that $\theta$ be 90° as shown. Teeth 60 and notches 62 may project obliquely from bottom surface 54. For example, if $\theta$ is less than 90°, teeth 60 act like a scraper against the surface of disc 12, cutting more asperities 46. However, if $\theta$ is greater than 90°, teeth 60 act like a broom against the surface of disc 12, dragging more particles along as disc 12 spins. Angles can be adjusted as necessary to meet manufacturing requirements.

Cutting performance can be adjusted by varying the shapes of teeth 60 and notches 62. Changing these shapes alters the angle of attack of each wall of teeth 60 and notches 62, which impacts the cutting performance.

The relative angle of attack of individual teeth 60 and notches 62 can also be manipulated by increasing or decreasing the overall angle $\alpha$ at which burnishing head 20 is mounted relative to translation arm 24. Angle $\alpha$ is the angle formed between longitudinal axis 68 of burnishing head 20 and longitudinal axis 70 of translator arm 24. FIGS. 2A and 2B depict angle $\alpha$ as being aligned, e.g. $\alpha=0°$, however this angle can be adjusted by up to 45° in either direction to optimize performance of burnishing head 20. Cutting surface area can be enhanced for a particular application by changing angle $\alpha$ to increase or decrease the approach angle of head 20. In certain embodiments where $\alpha \neq 0°$, burnishing head 20 is configured such that more defects on disc 12 strike serrated outer surface 58 first instead of leading edge or pads 66. In some embodiments, such as the one illustrated in FIG. 2B, increased cutting surface area is achieved even when $\alpha=0°$ because of triangular teeth 60 and notches 62 and the circular motion of disc 12.

The cutting performed by serrated outer surface 58 reduces the dependency on burnishing pads 66. The limited surface area available on bottom surface 54 restricts the available cutting area of burnishing pads 66. Serrated outer surface 58 leaves behind a lower density of asperities 46 after encountering teeth 60 and notches 62 on outer surface 58. By the time that asperities 46 reach burnishing pads 66 on subsequent rotations of disc 12, a higher percentage of remaining asperities 46 are already cut and overall surface smoothness is improved.

Not only is cutting performance enhanced by serrated side rails, deflection and accumulation of loose particles 48 and contaminants 50 (shown in FIG. 1A) is also improved. Similar to the enhanced cutting performance, improved cleaning is achieved due to the greater contact area on outer surface 58 and plurality of possible contact angles created by teeth 60 and notches 62. Some loose particles 48 strike side rail 22 in a similar manner to asperities 46. The plurality of contact angles and increased surface area on outer surface 58 creates more locations to strike particles 48 and impart enough force to deflect them off the surface of disc 12. Removal of particles 48 is also improved from the presence of notches 62.

Serrated outer surfaces 58, provide notches 62 of various shapes at several locations to collect particles 48 and contaminants 50. Notches 62 can be shaped to act like reservoirs collecting particles 48 and other contaminants 50, preventing buildup in one location. This can allow burnishing head 20 to be used for a longer cycle time between cleaning. In addition, collecting these defects on outer surface 58 may allow better flying stability of burnishing head 20.

Figure 3A:
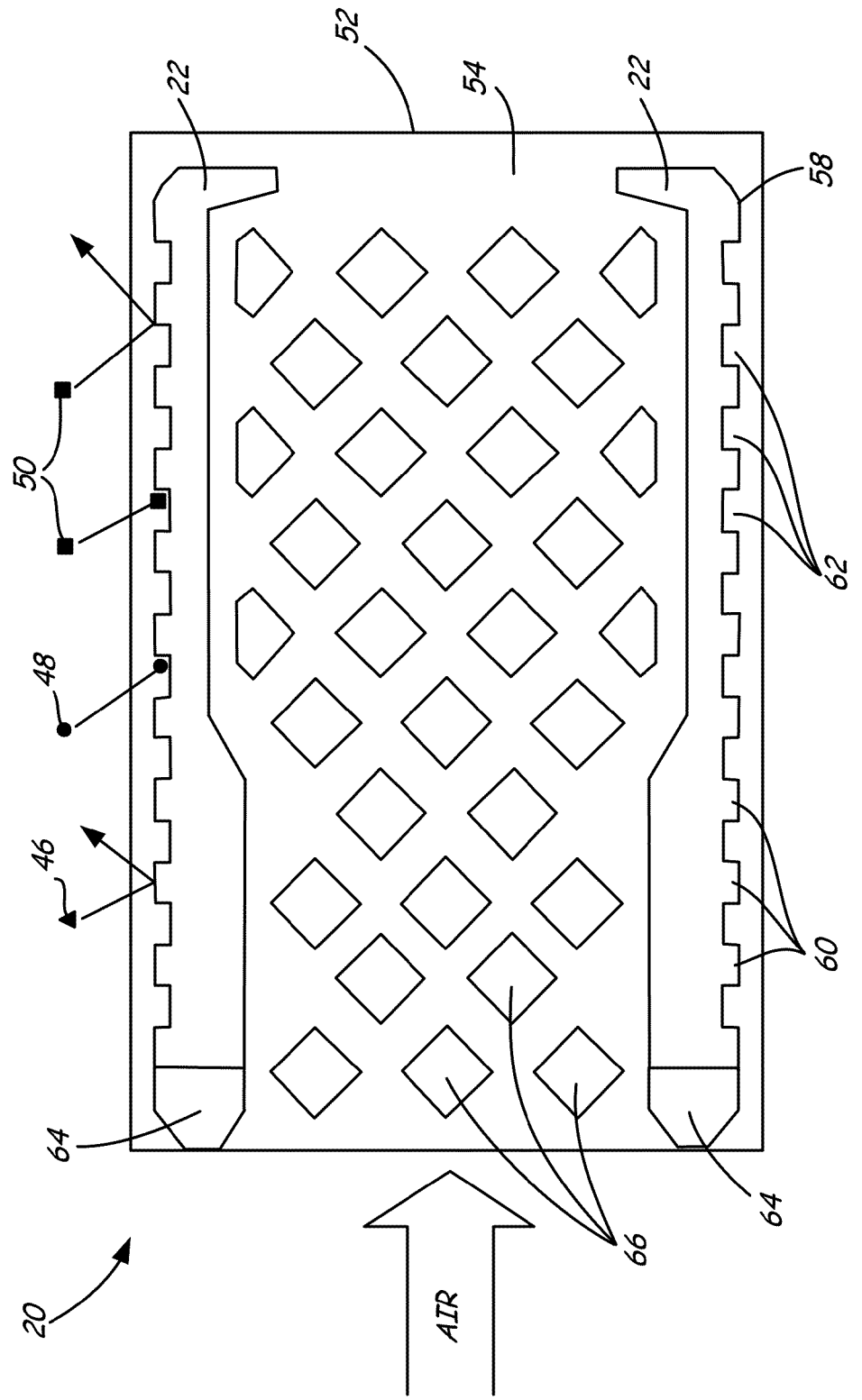
FIG. 3A is a bottom view of the burnish head with two side rails, each with rectangular serrations on the outside surfaces of both rails.
Figure 3B:
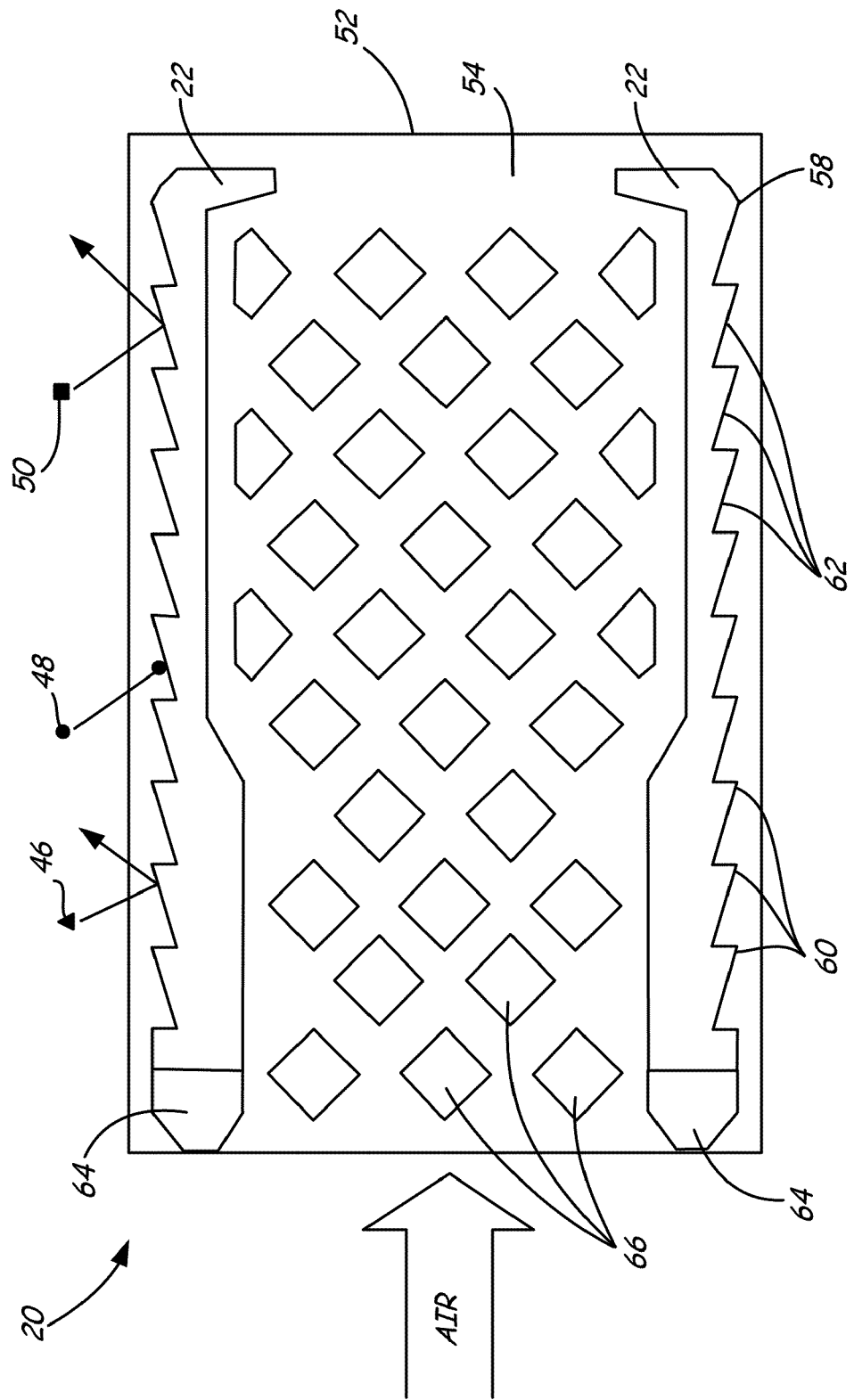
FIG. 3B is a bottom view of the burnish head with two side rails, each with triangular, sawtooth-like serrations on the outside surfaces of both rails.
Figure 3C:
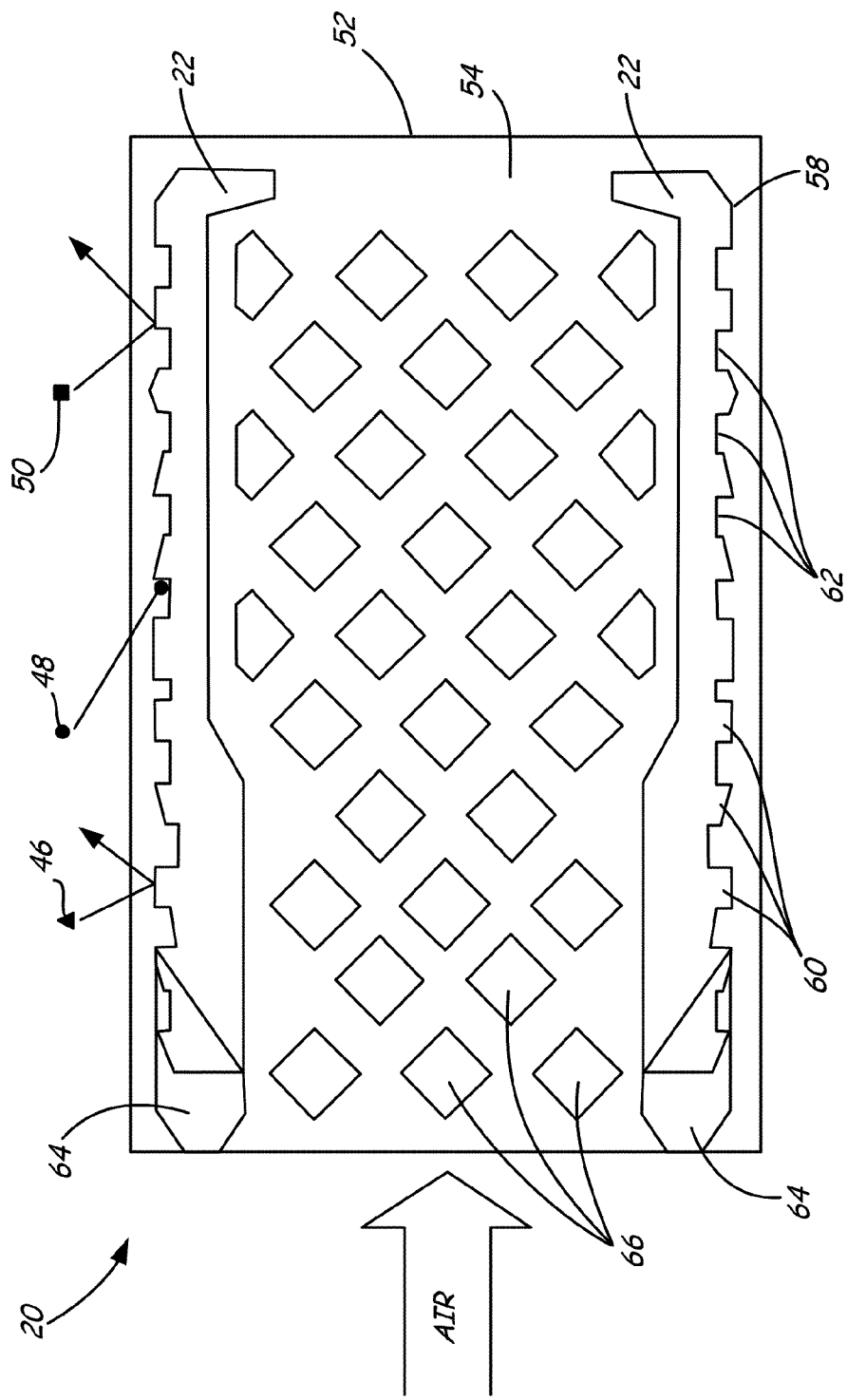
FIG. 3C is a bottom view of the burnish head with two side rails, each with irregular serrations on the outside surfaces of both rails.

FIGS. 3A-3C depict the interaction of various surface defects of disc 12 with features of the invention. FIG. 3A depicts a bottom view of burnishing head 20 with rectangular teeth 60 and resulting notches 62. FIG. 3A is similar to the embodiment depicted in FIG. 2A. FIG. 3B depicts a bottom view of burnishing head 20 with triangular sawtooth-like teeth 60 and resulting notches 62. The triangular serrations can be any form of triangle, including right, equilateral or isosceles. FIG. 3B is similar to the embodiment depicted in FIG. 2B. FIG. 3C depicts a bottom view of burnishing head 20 with a combination of rectangular, triangular, and irregular teeth 60, along with respective notches 62. Teeth 60 and notches 62 can be a mix of regular and irregular shapes as depicted, or it can be wholly comprised of irregular shapes. The particular selection of teeth 60 and notches 62 can be targeted to best integrate the use of a burnishing head with serrated outer surfaces into the needs of a particular manufacturing process.

As shown in FIGS. 3A-3C, defects striking outer surface 58 are partially or completely cleared by teeth 60 and notches 62. The use of serrated outer surfaces 58 on rails 22 increases the opportunities for reduction or removal of asperities 46. Asperities have a chance of striking various edges of teeth 60 and notches 62 at a plurality of different angles instead of a single wall at a single angle. This cutting effect is depicted in FIGS. 3A-3C for three different embodiments of teeth 60 and notches 62.

Similarly, particles 48 are also more likely to be deflected away or captured in notches 62 when compared to a straight outer edge. The greater surface area provided by serrated outer surfaces 58 also acts to deflect some particles 48, while collecting others in notches 62. Contaminants 50 also have more potential locations to be collected on outer surface 58 in the form of notches 62, which provides enhanced cleaning capacity.

While burnishing pads 66 perform significant cutting tasks during burnishing, increased cutting efficiency and cleaning efficiency cannot be realistically achieved simply by increasing the number of burnishing pads 66. Air must be free to pass in the voids between burnishing pads 66 or else the flying stability of burnishing head 20 is sacrificed. In each of the figures, burnishing pads 66 are arranged in a matrix pattern on the bottom of burnishing head 20 to balance cutting efficiency and flying stability of burnishing head 20. Though pads 66 are depicted as diamond shapes in the drawings, burnishing pads 66 may be any single shape or combination of shapes depending on the application.

With serrated outer surfaces 58 of rails 22, more defect cutting, deflecting of particles, and capturing of particles and contaminants occurs on outer surface 58. As such, particles 48 and contaminants 50 are trapped or collected before they can become trapped under burnishing head 20. Limiting the number of trapped particles between burnishing pads 66 and between burnishing pads 66 and side rails 22 maintains consistent air flow over the air bearing surfaces of side rails 22. This results in a more consistent flying height, and in even more efficient cutting and cleaning. In addition, the enhanced cleaning capacity results in fewer loose particles, which minimizes possible damage to disc 12. High speed contact with burnishing pads 66 or the air bearing surface of side rails 22 can result in embedding of particles 48 into the surface, causing permanent damage to disc 12.

Table 1 below illustrates the improvement in burnishing efficiency achieved with burnishing heads with serrated side rails versus burnishing heads with non-serrated side rails.

TABLE 1

Comparison of burnishing performed by serrated and non-serrated side rails.

| Head Type | Serrated rails | Non-serrated |
|---|---|---|
| Glide Yield | 69% | 39% |
| Mean Hard Hit Count/100 surfaces | 1.11 | 4.53 |
| Mean Soft Hit Count/100 surfaces | 2.19 | 23.76 |
| Mean Glide Noise/100 surfaces | 0.461 | 0.764 |

The data show a significant improvement in reducing defects by the burnishing head with serrated side rails, as can be seen by the increase in glide yield and the decrease in the various defects. Glide yield is a measure of discs passing a glide test after a defined burnishing process. The mean hard hit count per 100 surfaces is a measure of the average number of times that a glide head physically contacted an asperity during testing. The mean soft hit count per 100 surfaces is the average number of times that an asperity was high enough to affect the glide head but not high enough to make physical contact. The mean glide noise is the relative amount of background noise that the glide head measures over the entire disc surface. As shown in Table 1, burnishing heads having serrated side rails clearly show improved burnishing efficiency in all typical measurements over burnishing heads with non-serrated side rails.

Certain shapes and arrangements of teeth and notches on the side rails of burnishing head 20 will exhibit better surface cleaning, while other arrangements will exhibit better cutting efficiency. The needs of a particular burnishing application will determine the selection of the shape and arrangement of notches and teeth to balance cutting and cleaning requirements and optimize the overall disc manufacturing process. Several other factors that affect burnishing include variations in initial disc quality, disc rotation speed, disc material, and burnishing material, and angle α formed by burnishing head axis 68 and translation arm axis 70. These factors may also be taken into account in the design of the serrated side rails for a particular burnishing application.

The relative proportion of each defect can also affect the choice of shapes used on outer surface 58. Discs with more particles 48 and contaminants 50 are burnished better if outer surface 58 has larger notches 62, which act to collect these defects. In contrast, larger teeth 60 with more cutting area will more effectively burnish discs with more asperities 46. While complex shapes may increase both cutting and cleaning efficiency, the costs of fabricating such shapes on a micron or submicron scale may also increase.

Although the present invention has been described with reference to preferred embodiments, workers skilled in the art will recognize that changes may be made in form and detail without departing from the scope of the invention as claimed. The implementations described above and other implementations are within the scope of the following claims.

The invention claimed is:

1. A head comprising:
   a slider body having a top surface and a bottom surface; and
   a first side rail and a second side rail projecting from the bottom surface, the side rails each having a leading surface, trailing surface, bottom surface, inside surface, and outside surface; wherein the outside surface of the first side rail includes serrations.

2. The head of claim 1, wherein the outside surface of the second side rail includes serrations.

3. The head of claim 2, wherein the serrations include teeth and notches on the side rails and wherein the teeth are the shape of rectangular, triangular, polyhedral, or irregular solids.

4. The head of claim 1, wherein the slider body is substantially rectangular, having a leading edge and a trailing edge, connected by an inner edge and an outer edge defining a longitudinal axis.

5. The head of claim 4, wherein the side rails are substantially parallel to the longitudinal axis of the head.

6. The head of claim 1, wherein the head is operably secured to a translator arm.

7. The head of claim 1, wherein the serrations accumulate loose particles from a disc.

8. An apparatus comprising:
   a burnishing head including a slider body, an array of burnishing pads projecting from the slider body, and first and second side rails projecting from the slider body on opposite sides of the array of burnishing pads, the side rails each having an outer surface opposite an inner surface: wherein the first side rail outer surface is serrated;
   a rotation mechanism for rotating a disc; and
   a translation mechanism for sweeping the burnishing head across a surface of the disc while the disc is rotated.

9. The apparatus of claim 8, wherein the second side rail outer surface is serrated.

10. The apparatus of claim 8, wherein the serrated outer surface defines a plurality of teeth and notches.

11. The apparatus of claim 10, wherein the teeth form rectangular, triangular, polyhedral, or irregular solids.

12. The apparatus of claim 8, wherein the slider body is substantially rectangular, having a leading edge and a trailing edge, connected by an inner edge and an outer edge defining a longitudinal axis.

13. The apparatus of claim 12, wherein the side rails are substantially parallel to the longitudinal axis of the burnishing head.

14. A slider comprising:
   first and second side rails projecting from a bottom surface of the slider, each side rail having a leading side, trailing side, bottom side, inner side, and outer side; wherein the outer side of the first side rail comprises protrusions.

15. The slider of claim 14, wherein the protrusions are teeth.

16. The slider of claim 15, wherein the protrusions are uniform.

17. The slider of claim 15, wherein the protrusions are non-uniform.

18. The slider of claim 14, wherein the outer side of the second side rail comprises protrusions.

* * * * *